US012283261B1

(12) United States Patent
McBride et al.

(10) Patent No.: US 12,283,261 B1
(45) Date of Patent: Apr. 22, 2025

(54) MULTI-PICK GUITAR PICK

(71) Applicants: Cole Eshee Heve McBride, Victoria (CA); Andres Luciano Somasco, Nelson (CA)

(72) Inventors: Cole Eshee Heve McBride, Victoria (CA); Andres Luciano Somasco, Nelson (CA)

(73) Assignee: Cole McBride, Victoria (CA)

( * ) Notice: Subject to any disclaimer, the term of this patent is extended or adjusted under 35 U.S.C. 154(b) by 265 days.

(21) Appl. No.: 18/137,299

(22) Filed: Apr. 20, 2023

Related U.S. Application Data

(60) Provisional application No. 63/451,495, filed on Mar. 10, 2023.

(51) Int. Cl.
*G10D 3/173* (2020.01)

(52) U.S. Cl.
CPC .................................... *G10D 3/173* (2020.02)

(58) Field of Classification Search
CPC ................................ G10D 3/173; G10D 3/00
See application file for complete search history.

(56) References Cited

U.S. PATENT DOCUMENTS 4,253,372 A 3/1981 Filipetti
4,651,614 A 3/1987 Cavallo
4,867,032 A 9/1989 Lukehart
5,253,562 A 10/1993 Kline
D490,459 S 5/2004 Sarmas
6,949,700 B1 9/2005 Kelly
7,265,285 B2 9/2007 Storey
D557,330 S 12/2007 Parikh
7,462,768 B2 12/2008 Newmaster
7,799,979 B2 9/2010 Swartz
D688,736 S 8/2013 Lilly
8,872,008 B2 10/2014 Taylor
8,962,959 B1 2/2015 Mier
9,202,446 B2 12/2015 Gauthier
9,691,365 B2 6/2017 Pascale
D868,881 S 12/2019 VanHaight
2005/0204893 A1 9/2005 Luschniu
2009/0229442 A1 9/2009 Hollin, Jr.
2013/0092008 A1 4/2013 Murphy
2015/0255050 A1 9/2015 Diaz Lopez
2017/0011720 A1 1/2017 Pascale
2020/0342834 A1 10/2020 Choi

FOREIGN PATENT DOCUMENTS

CN 111243555 A * 6/2020 ............. G10D 3/173

* cited by examiner

*Primary Examiner* — Kimberly R Lockett
(74) *Attorney, Agent, or Firm* — QuickPatents; Kevin Prince

(57) ABSTRACT

The present invention is a multi-pick guitar pick for a guitarist, including a plurality of interlocking picks, each interlocking pick including a top side, a bottom side, a front end terminating at a guitar picking point, and a rear end terminating in a lower plate and an upper plate, the lower plate and the upper plate each having apertures therethrough, each interlocking pick configured for interlocking with at least one other adjacent interlocking pick, such that the upper plate overlaps the lower plate of the adjacent pick and the aperture of the upper plate aligns with the aperture of the lower plate of the adjacent pick. Embodiments may also include a mechanical fastener fixable through each of the aligned apertures of adjacent picks to secure the adjacent picks together.

10 Claims, 5 Drawing Sheets

MULTI-PICK GUITAR PICK

CROSS-REFERENCE TO RELATED APPLICATIONS

This application claims the benefit of U.S. Provisional Patent Application 63/451,495, filed on Mar. 10, 2023, and is incorporated herein by reference.

STATEMENT REGARDING FEDERALLY SPONSORED RESEARCH AND DEVELOPMENT

Not Applicable.

FIELD OF THE INVENTION

This invention relates to guitar picks, and more particularly to a multi-pick guitar pick.

BACKGROUND OF THE INVENTION

Generally, picks for guitars are typically made from triangular pieces of material such as plastic, horn, metal, stone, shell, bone, wood, and the like. The picks normally include flat bodies with two more-rounded corners and a less-rounded corner. The two more-rounded corners are for grasping between thumb and finger, and a less-rounded playing corner or tip is used to strum or pluck the strings of the guitar.

Moreover, picks are often differentiated by gauge, that is, their relative stiffness or degree of flexibility. Particularly, the varying stiffness is achieved by using different thicknesses of the same material, or by using different materials. Picks of different gauge produce different sounds and playability, given the same instrument. Therefore, the guitar players who want to produce different sounds from a single instrument often keep an assortment of picks to choose from during a music session.

U.S. patent application No. 20130092008A1 to Murphy discloses a multi-gauge guitar pick. The multi-gauge guitar pick includes at least three corners, where at least two of the corners have a different gauge or stiffness to produce different sounds from the same instrument. Although the invention includes the feature of having different gauge at different corners, it fails to cover the feature of adjoining three different picks with different shapes of the corners, and does not provide for interchangeable pick corners.

U.S. patent application No. 20170011720A1 to Pascale discloses an equilateral guitar pick uniquely designed for "variability and versatility" strumming. The pick frame is large with three recessed grooves used for rapid rotation like a wheel, which when used leads a variation in sound when a transition is initiated by switching from one pick corner to another. Although the application is an improvement to the other prior art picks in terms of providing the different shapes at the tips of the pick, this prior art reference fails to provide us with a variability of providing different widths on different tips for providing different materials for any of the tips.

The prior art fails to disclose a multi-pick guitar pick that includes a number of picks with different materials and different shapes for the tips or picks. Therefore, a system with multiple, interchangeable picks is needed to provide for playing different sounds on the same instrument. Such a needed device would provide for different widths and materials of picks. The present invention accomplishes these objectives.

SUMMARY OF THE INVENTION

The present invention is a multi-pick guitar pick for a guitarist, including a plurality of interlocking picks, each interlocking pick including a top side, a bottom side, a front end terminating at a guitar picking point, and a rear end terminating in a lower plate and an upper plate, the lower plate and the upper plate each having apertures therethrough, each interlocking pick configured for interlocking with at least one other adjacent interlocking pick, such that the upper plate overlaps the lower plate of the adjacent pick and the aperture of the upper plate aligns with the aperture of the lower plate of the adjacent pick. A mechanical fastener is fixable through each of the aligned apertures of adjacent picks to secure the adjacent picks together. The guitarist can rotate the multi-pick guitar pick to select which of the interlocking picks to use. Further, the guitarist can flip the guitar pick to select which order the multiple picks are arranged.

In some embodiments, the plurality of interlocking picks may be exactly three, a first of the interlocking picks fixable with a second of the interlocking picks and a third of the interlocking picks, and the second of the interlocking picks fixable with the third of the interlocking picks. In some embodiments, the guitar picking points of the interlocking picks may be each angled away from each other at substantially 22-degrees.

Embodiments may also include at least one of the interlocking picks has a guitar picking point with a different shape than shapes of the guitar picking points of the other of the interlocking picks. Embodiments may also include at least one of the interlocking picks may be made with a different material than a material of the other interlocking picks. Embodiments may also include each mechanical fastener when engaged with two of the interlocking picks extending outwardly away from the top sides and/or bottom sides of the interchangeable picks.

Embodiments may also include each mechanical fastener when engaged with two of the interlocking picks extends outwardly away from the bottom sides of the interchangeable picks. Embodiments may also include each mechanical fastener may be made with a rigid metal material and takes the form of a metal rivet. Embodiments may also include each mechanical fastener may be made with an elastomeric material to allow flexing between the interlocking picks.

The present invention is a multi-pick guitar pick that includes a number of picks with differing materials and shapes for the tips or picks, to provide for playing different sounds with different feels on a single instrument. The present device provides for interchangeability of picks. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Figure 1:
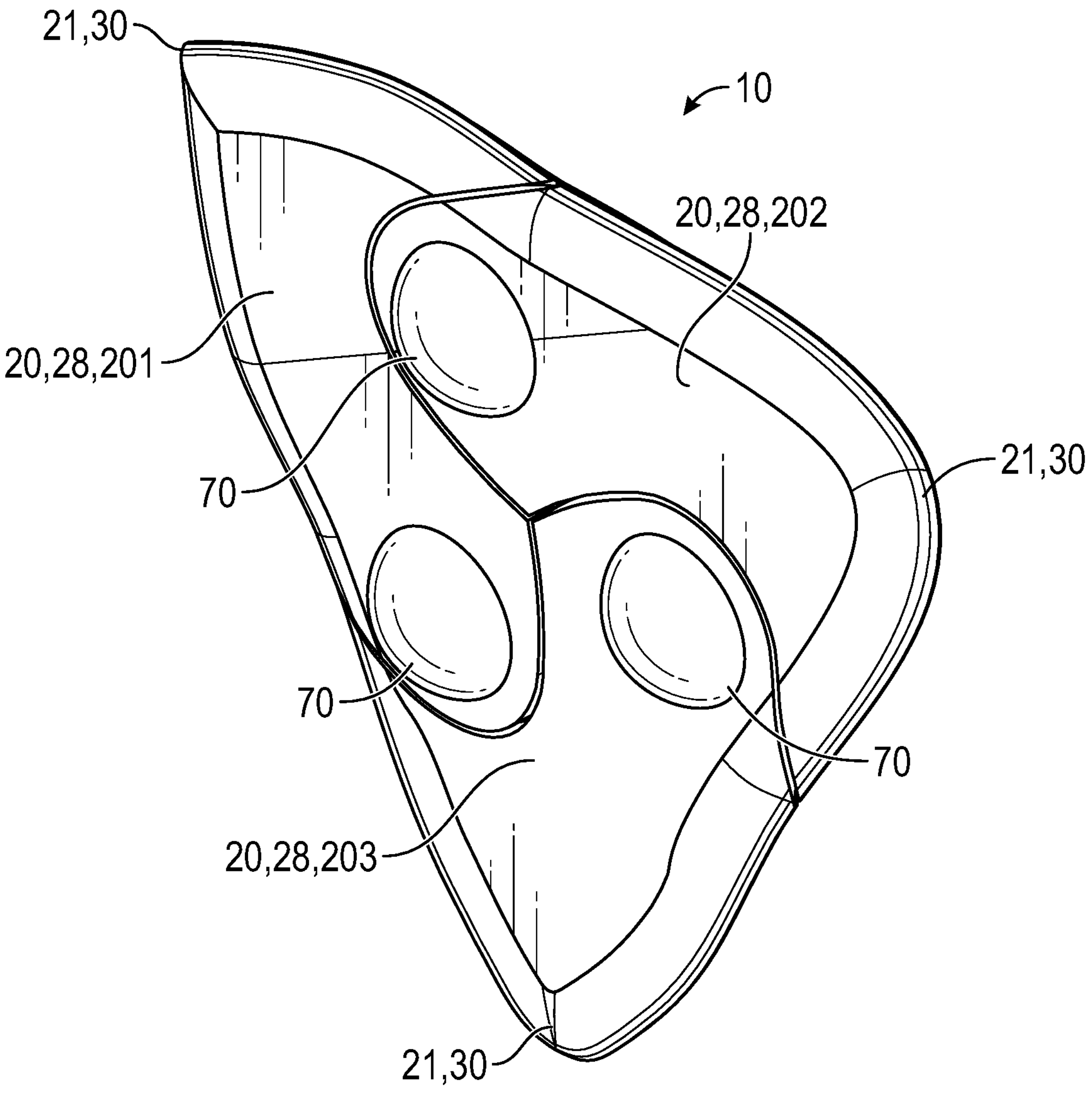
FIG. 1 is front perspective view of the invention.
Figure 2:
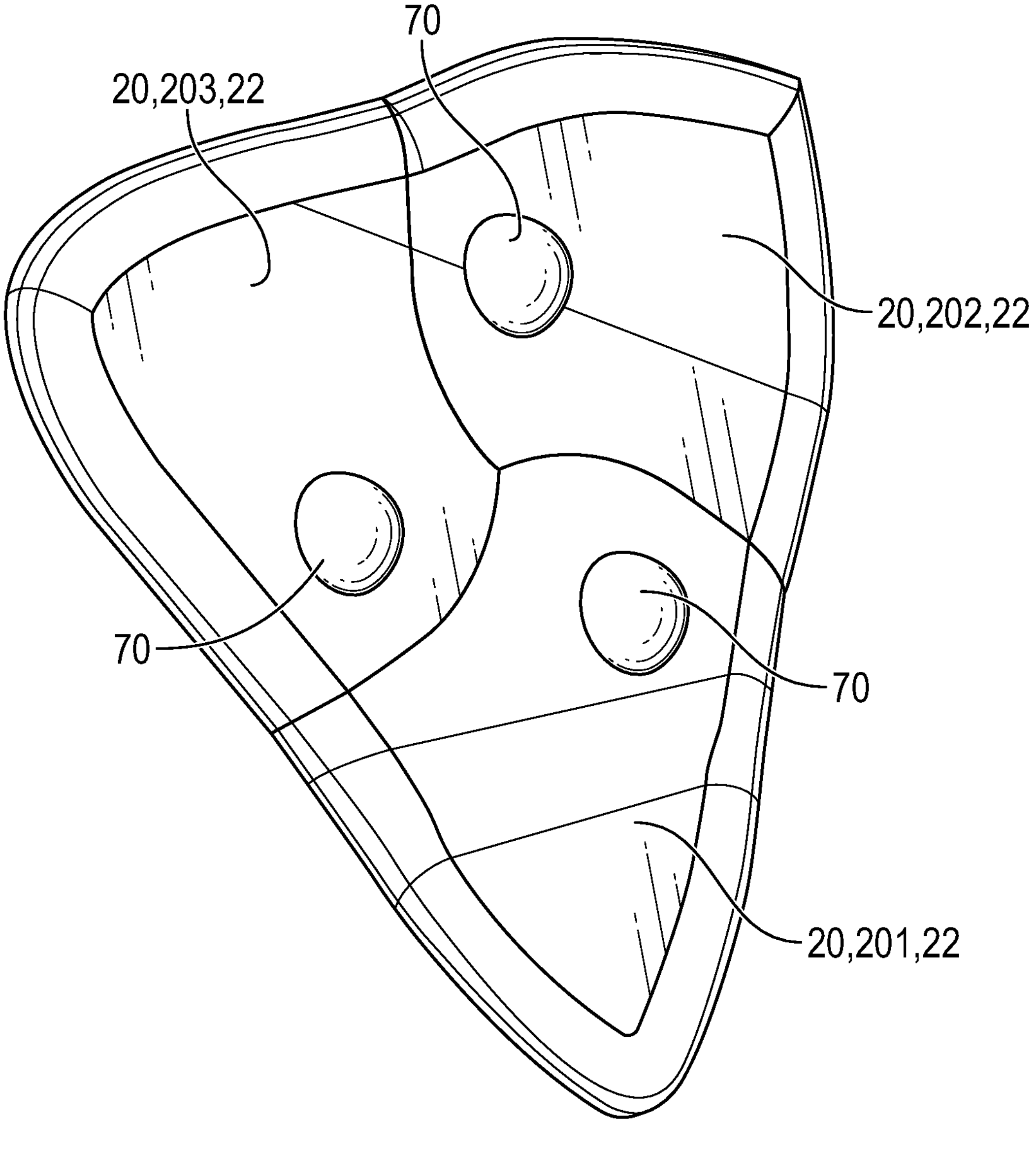
FIG. 2 is a rear perspective view thereof.
Figure 3:
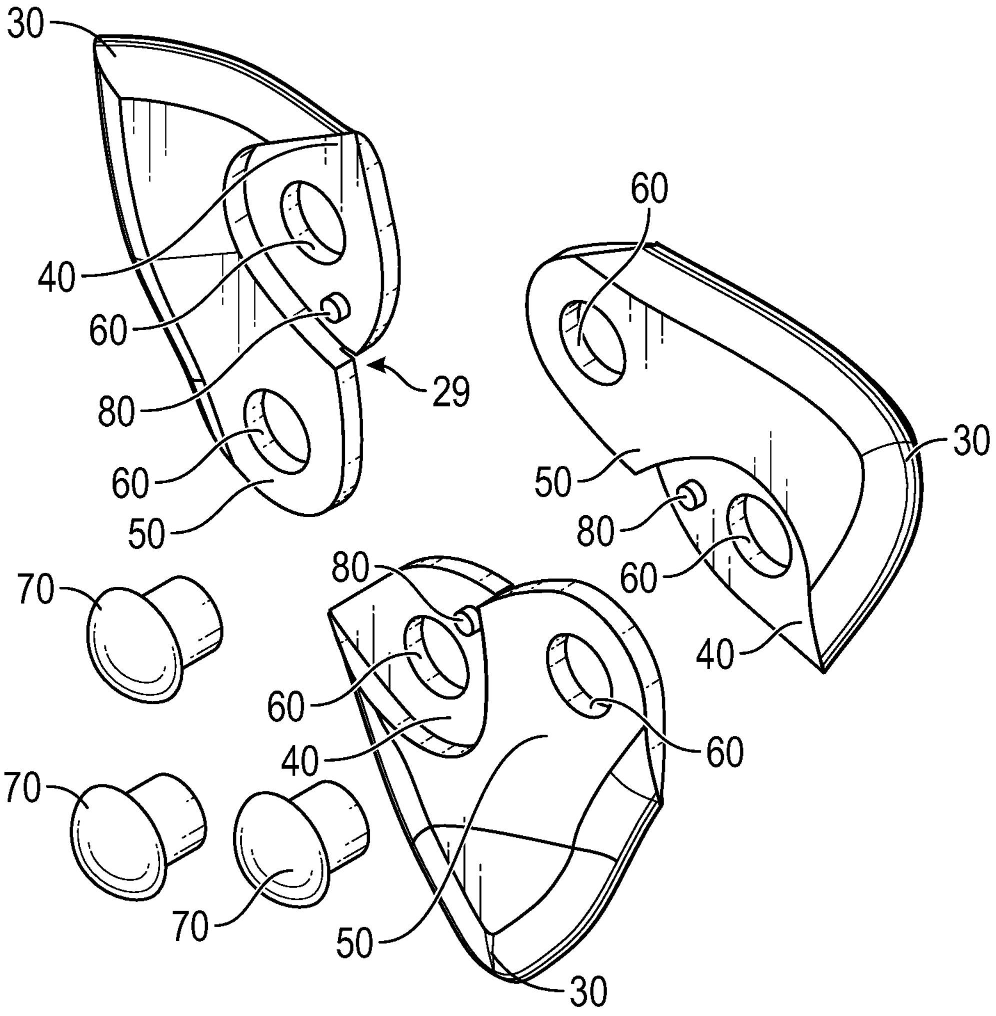
FIG. 3 is an exploded front perspective view thereof, illustrating three mechanical fasteners as removed from apertures formed in lower and upper plates of three interlocking picks.
Figure 4:
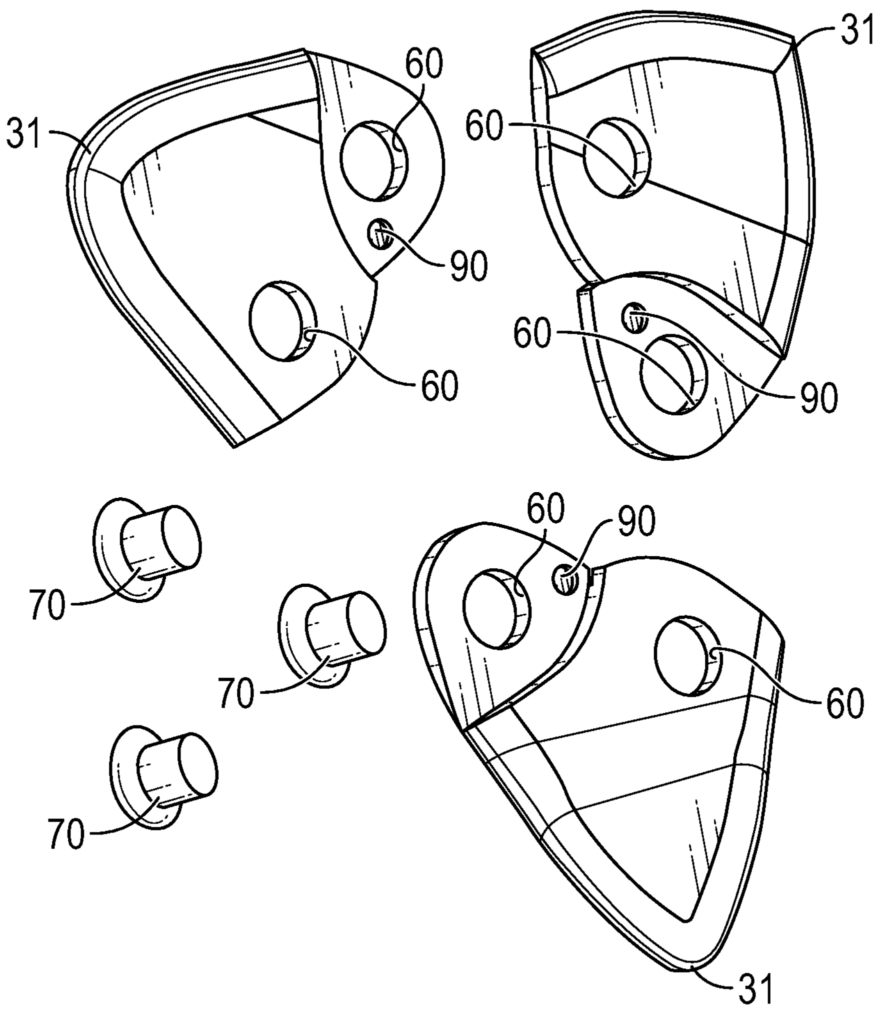
FIG. 4 is an exploded rear perspective view thereof.

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

FIGS. 1-4 describe a multi-pick guitar pick 10, according to some embodiments of the present disclosure. The multi-pick guitar pick 10 includes a plurality of interlocking picks 20 each having a top side 28, a bottom side 22, a front end 21 terminating at a guitar picking point 30, and a rear end 29 terminating in a lower plate 40 and an upper plate 50. The lower plate 40 and the upper plate 50 each have an aperture 60 therethrough.

A mechanical fastener 70 is fixable through each of the aligned apertures 60 of adjacent interlocking picks 20 to secure the adjacent interlocking picks 20 together (FIGS. 10 and 11). In use, the guitarist can rotate the multi-pick guitar pick 10 to select which of the interlocking picks 20 to use. The guitarist can also flip the multi-pick guitar pick 10 to select an order of the interlocking picks 20 as the device is rotated.

In some embodiments, the plurality of interlocking picks 20 may be exactly three, a first 201 of the interlocking picks 20 fixable with a second 202 of the interlocking picks 20 and a third 203 of the interlocking picks 20. In such an embodiment, the second 202 of the interlocking picks 20 is fixable with the third 203 of the interlocking picks 20. The guitar picking points 30 of the interlocking picks 20 in such an embodiment are angled away from each other at substantially 120-degrees.

In some embodiments, at least one of the interlocking picks 20 may be made with a different material than a material of the other interlocking picks 20. For example, the first 201 of the interlocking picks 20 may be made with a rigid PVC plastic material, whereas the second 202 of the interlocking picks 20 may be made with a less rigid polyethylene material or elastomeric material.

Similarly, in some embodiments, at least one of the interlocking picks 20 has a guitar picking point 30 having a different shape than those of the guitar picking points 30 of the other interlocking picks 20. A sharper guitar picking point 30 results in a different sound on a guitar when compared with a duller guitar picking point 30, for example.

Figure 5:
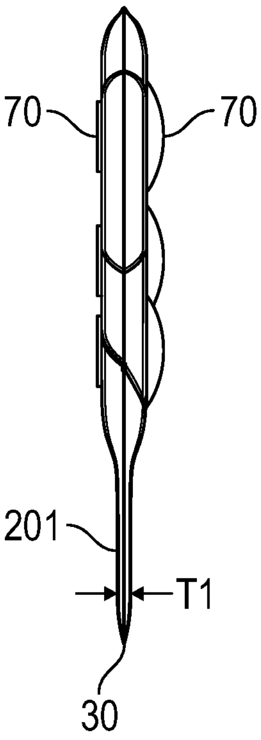
FIG. 5 is a side elevational view thereof showing a pick thickness of one of the interlocking picks.
Figure 6:
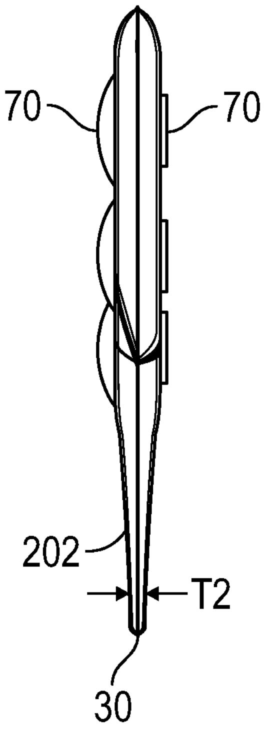
FIG. 6 is an alternate side elevational view of another of the interlocking picks, showing a different pick thickness.

Similarly, in some embodiments, at least one of the interlocking picks 20 has a guitar picking point 30 having a different thickness Tx than those of the guitar picking points 30 of the other interlocking picks 20. A guitar picking point 30 having a thickness $T_1$ (FIG. 5), for example, may be thicker than a guitar picking point 30 having a thickness $T_2$ (FIG. 6), resulting in a different feel for the guitarist and a different sound produced by each picking point 30.

In some embodiments, each mechanical fastener 60, when engaged with two of the interlocking picks 20, extends outwardly away from the top sides 28 of the interchangeable picks 20 and/or outwardly away from the bottom sides 22 of the interchangeable picks 20. In some embodiments, each mechanical fastener 60 may be made with a rigid metal material and takes the form of a metal rivet. As such, the interlocking picks 20 are substantially permanently fixed together. In other embodiments, each mechanical fastener 70 may be made with an elastomeric material, such as a silicone rubber, to allow flexing between the interlocking picks 20 and a comfortable feel for the guitarist, and to allow for a friction fit of the mechanical fastener 70 within each of the apertures 60. Such elastomeric mechanical fasteners 70 may be selectively removed from the apertures 60 to interchange other of the interlocking picks 20 that have different material or shape properties.

In some embodiments, a locking tab 80 projects away from either the lower plate 40 or the upper plate 50 and engages a cooperative locking recess 90 in either the upper plate 50 or the lower plate 40 of an adjacent of the interlocking picks 20. These cooperative locking tabs 80 and locking recesses 90 aid the mechanical fastener 70 in keeping the interlocking picks 20 fixed firmly together to inhibit relative movement between the interlocking picks 20.

While a particular form of the invention has been illustrated and described, it will be apparent that various modifications can be made without departing from the spirit and scope of the invention. For example, the multi-pick guitar pick 10 could include exactly two of the interlocking picks 20, or four of the interlocking picks 20, by changing angles associated with the upper plates 50 and the lower plates 40 of each of the interlocking picks 20. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A multi-pick guitar pick for a guitarist, comprising:

a plurality of interlocking picks, each interlocking pick including a top side, a bottom side, a front end terminating at a guitar picking point, and a rear end terminating in a lower plate and an upper plate, the lower plate and the upper plate each having apertures therethrough, each interlocking pick configured for interlocking with at least one other adjacent interlocking pick, such that the upper plate overlaps the lower plate of the adjacent pick and the aperture of the upper plate aligns with the aperture of the lower plate of the adjacent pick; and a mechanical fastener fixable through each of the aligned apertures of adjacent picks to secure the adjacent picks together;

whereby the guitarist can rotate the multi-pick guitar pick to select which of the interlocking picks to use.

2. The multi-pick guitar pick of claim 1 wherein the plurality of interlocking picks is exactly three, a first of the interlocking picks fixable with a second of the interlocking picks and a third of the interlocking picks, and the second of the interlocking picks fixable with the third of the interlocking picks, whereby the guitar picking points of the interlocking picks are each angled away from each other at substantially 120-degrees.

3. The multi-pick guitar pick of claim 1 wherein at least one of the interlocking picks has a guitar picking point with a different shape than shapes of the guitar picking points of the other of the interlocking picks.

4. The multi-pick guitar pick of claim 1 wherein at least one of the interlocking picks is made with a different material than a material of the other interlocking picks.

5. The multi-pick guitar pick of claim 1 wherein each mechanical fastener when engaged with two of the interlocking picks extends outwardly away from the top sides of the interlocking picks.

6. The multi-pick guitar pick of claim 1 wherein each mechanical fastener when engaged with two of the interlocking picks extends outwardly away from the bottom sides of the interlocking picks.

7. The multi-pick guitar pick of claim 5 wherein each mechanical fastener when engaged with two of the interlocking picks extends outwardly away from the bottom sides of the interlocking picks.

8. The multi-pick guitar pick of claim 1 wherein each mechanical fastener is made with a rigid metal material and takes the form of a metal rivet.

9. The multi-pick guitar pick of claim 1 wherein each mechanical fastener is made with an elastomeric material to allow flexing between the interlocking picks.

10. A multi-pick guitar pick for a guitarist, comprising:

three interlocking picks, each interlocking pick including a top side, a bottom side, a front end terminating at a guitar picking point, and a rear end terminating in a lower plate and an upper plate, the lower plate and the upper plate each having apertures therethrough, each interlocking pick configured for interlocking with each other adjacent interlocking pick, such that the upper plate overlaps the lower plate of the adjacent pick and the aperture of the upper plate aligns with the aperture of the lower plate of the adjacent pick; and a mechanical fastener fixable through each of the aligned apertures of adjacent picks to secure the adjacent picks together;

wherein at least one of the interlocking picks has a guitar picking point with a different shape than shapes of the guitar picking points of the other of the interlocking picks;

wherein at least one of the interlocking picks is made with a different material than a material of the other interlocking picks;

wherein each mechanical fastener when engaged with two of the interlocking picks extends outwardly away from the top sides of the interlocking picks and the bottom sides of the interlocking picks; and wherein each mechanical fastener is made with an elastomeric material to allow flexing between the interlocking picks;

whereby the guitarist can rotate the multi-pick guitar pick to select which of the three interlocking picks to use.

* * * * *